United States Patent [19]
Sanghera et al.

[11] Patent Number: 5,779,757
[45] Date of Patent: Jul. 14, 1998

[54] PROCESS FOR REMOVING HYDROGEN AND CARBON IMPURITIES FROM GLASSES BY ADDING A TELLURIUM HALIDE

[75] Inventors: Jasbinder S. Sanghera, Greenbelt; Vinh Q. Nguyen, Lanham, both of Md.; Ishwar D. Aggarwal, Fairfax Station, Va.

[73] Assignee: The United States of America as represented by the Secretary of the Navy, Washington, D.C.

[21] Appl. No.: 670,910

[22] Filed: Jun. 26, 1996

[51] Int. Cl.⁶ ............................................ C03B 5/00
[52] U.S. Cl. ............ 65/389; 65/DIG. 15; 423/508; 423/509; 501/40
[58] Field of Search ............... 65/389, DIG. 15, 65/435; 423/508, 509, 561.1, 511; 501/40

[56] References Cited

U.S. PATENT DOCUMENTS

| | | | |
|---|---|---|---|
| 3,006,720 | 10/1961 | L'Heureux | 423/509 |
| 4,557,914 | 12/1985 | Modone | 423/509 |
| 4,745,090 | 5/1988 | Lucas | 501/40 |
| 4,801,442 | 1/1989 | Nishii | 423/508 |
| 5,352,639 | 10/1994 | Lucas | 501/40 |

FOREIGN PATENT DOCUMENTS

| | | | |
|---|---|---|---|
| 817335 | 7/1969 | Canada | 423/509 |
| 812707 | 3/1981 | U.S.S.R. | 423/509 |

*Primary Examiner*—John Hoffmann
*Attorney, Agent, or Firm*—Thomas E. McDonnell; Barry Edelberg

[57] ABSTRACT

Hydrogen and/or carbon impurities are removed from chalcogenide or chalcohalide glasses by the addition of a halide, such as $TeCl_4$, to the batch composition. During melting of the batch composition, the metal halide reacts with the hydrogen and/or carbon impurities to form a hydrogen halide and/or carbon tetrahalide gas and a metal which becomes incorporated into the chalcogen-based glass. Useful halides include halides of sulfur, selenium, tellurium, polonium, or halides of a metal (such as aluminum, magnesium, zirconium, or a mixture thereof) that forms a stable oxide. Mixed metal halides may also be used. The glass melt is then distilled, outgassed, homogenized, fined, and annealed. An apparatus specially designed for making a fiber preform by the above process is also described. An annealed preform made by this method may be drawn into a low-loss fiber in the 2 μm to 12 μm range.

16 Claims, 4 Drawing Sheets

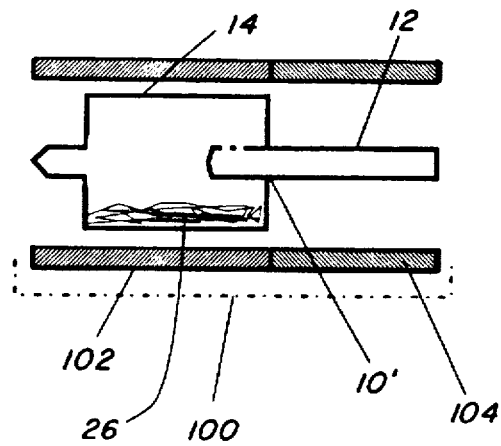
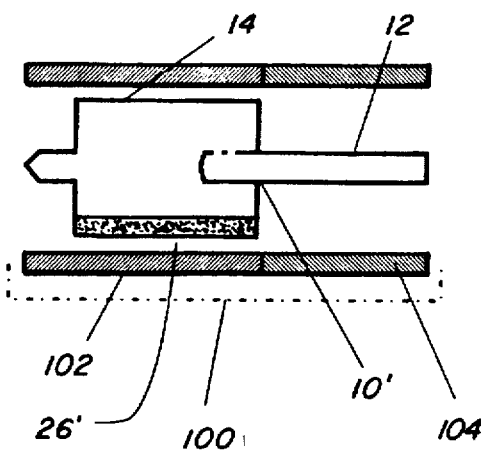
FIG. 3a  FIG. 3b
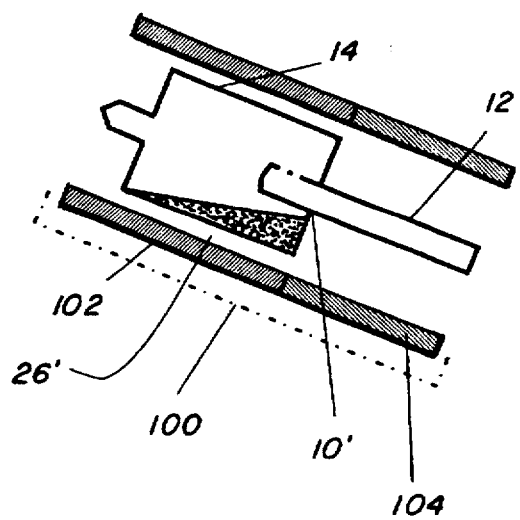
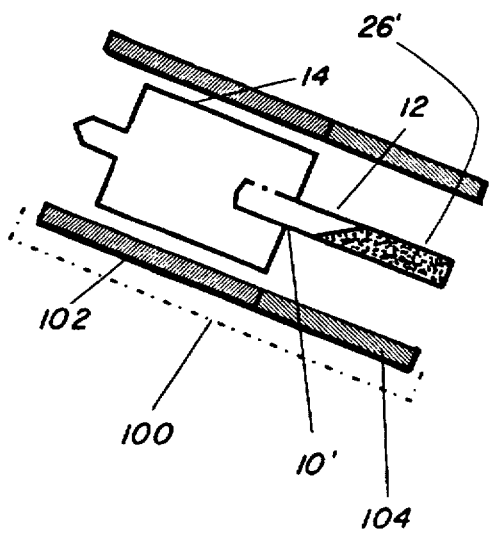
FIG. 4a  FIG. 4b

PROCESS FOR REMOVING HYDROGEN AND CARBON IMPURITIES FROM GLASSES BY ADDING A TELLURIUM HALIDE

BACKGROUND OF THE INVENTION

1. Field of the Invention

The present invention relates generally to a process for removing hydrogen and carbon impurities from glasses, and more specifically to a process for removing hydrogen and carbon impurities from IR-transmitting glasses.

2. Description of the Background Art

Currently, there is great interest in IR transmitting glass fibers. Much of this centers about the use of glasses based on the chalcogen elements S, Se, and Te. This interest arises because, depending upon composition, these fibers transmit in the so-called "fingerprint" region of about 2–12 μm where practically all molecular species possess characteristic IR vibrational bands. Therefore, fibers made from these glasses can be used in fiber optic chemical sensing systems using evanescent, absorption, or diffuse reflectance types of probes for environmental clean up. In addition, these fibers are required for laser threat warning systems, IRCM and high energy IR laser power delivery systems to enhance aircraft survivability, especially in the 2–5 μm region. Also, these low phonon energy chalcogenide glasses are excellent host materials for rare-earth doping. Fluorescence and laser transitions beyond 2μ, which might not be seen in other high energy phonon host materials, are possible.

While silica and fluoride fibers do not transmit much beyond 2 and 3 μm, respectively, the chalcogenide glasses are ideal candidates for transmission to beyond 2 μm. However, the chalcogenide glasses contain several major impurity absorption bands associated with hydrogen, namely H—Z, where Z is a chalcogen. These bands are attributed to H—S in sulphide glasses and H—Se in selenide glasses. The H—Te bond is unstable and so H—Te bands are not observed in telluride glasses. The origin of the hydrogen impurity is considered to be largely attributed to the chalcogen precursor. It is believed that the H—Z can be present in two forms, namely molecular $H_2Z$ gas dissolved in the glass or as H—(Z—Z)$_n$—H. In the latter case, the hydrogen atoms terminate chains of sulphur or selenium in the glass. The fundamental H—Se band at about 4.6 μm can be as high as about 100 dB/m as demonstrated in a $Ge_{20}Se_{80}$ glass.

The concentration of H—Z can be estimated from the extinction coefficients shown in Table 1.

TABLE 1

| Band | Extinction Coefficient (dB/m/ppm) |
|---|---|
| H—S$_{4.0 \mu m}$ | 2.3 |
| H—Se$_{4.6 \mu m}$ | 1.1 |

Hence, a H—Se band peak height of 100 dB/m corresponds to approximately 100 ppm H—Se impurity. These bands are too high for practical applications and therefore, there is a critical need to remove the H—Z impurities from the glasses and fibers. This removal will subsequently reduce the loss of the fiber and make chalcogenide and chalcohalide fibers more practical. In addition, carbon impurities have been identified in chalcogenide glasses, based on the presence of absorption bands beyond 5 μm. These carbon impurities must also be removed. The origin of these carbon impurities, however, is unknown. Furthermore, no attempts have been made to remove these absorption bands.

To date, the chalcogen elements have been purified under vacuum, an inert gas atmosphere such as Ar or $N_2$ or a reactive atmosphere. In the latter case, Ar gas is bubbled through liquids such as $S_2Cl_2$ or $Se_2Cl_2$ and the resulting vapors then transported over the chalcogen elements during their distillation processes. It is envisioned that the Cl reacts with the H—Z impurity to form HCl, a gaseous by-product.

However, there are several drawbacks with this scheme since the H—Z bands are not completely removed and are usually present with a peak height of severaldB/m. The major drawbacks are outlined below:

1) The distillation temperatures are low, typically about 200° C. for sulphur and 500° C. for Se. Therefore, the rate of reaction between hydrogen and the $S_2Cl_2$ or $Se_2Cl_2$ species is slow.
2) The reaction rate is also slow since the reaction occurs predominantly in the vapor phase.
3) Distillation is a one shot deal. Therefore, once any unreacted H—Z has distilled over with the chalcogen into the cooler regions, it will not be further reacted and eliminated. The sulphur or selenium has to be subsequently distilled to remove excess Cl. Unless removed, the excess Cl would cause bubble formation in the glass.
5) There is no way to eliminate any hydrogen contamination that might occur on subsequent handling of the precursors during batching of the glasses and glass fabrication.

SUMMARY OF THE INVENTION

Accordingly, it is an object of this invention to remove hydrogen and/or carbon impurities from glasses that transmit in the IR range.

It is another object of the present invention to remove hydrogen and/or carbon impurities from chalcogen and chalcohalide glasses.

It is a further object of the present invention to reduce losses in glasses that transmit in the IR range.

These and additional objects of the invention are accomplished by the addition of a halide to the batch composition. The halide may be a halide of tellurium, selenium, sulfur, polonium, or a halide of a metal, such as aluminum, magnesium or zirconium, that forms a stable oxide. The batch composition is then melted and distilled. The reaction of the halide with the batch composition and subsequent melt forms gaseous H—X, where X is a halogen, the tellurium, selenium, sulfur, polonium or metal component of the halide, which component remains as a dopant in the glass. Where the halide is a metal halide and forms a stable oxide, the metal halide also reacts with any oxides present in the batch glass to form a refractory oxide such as $Al_2O_3$. The refractory oxide is left behind after distillation of the melt formed from the batch composition. In the case or carbon removal, the reaction leads to the formation of gaseous C—$X_4$, where X is a halogen. If X=Cl, then $CCl_4$ is formed.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIG. 3a shows the apparatus of FIG. 2 within a two-zone furnace just before melting of the batch composition.

FIG. 3b shows the furnace and apparatus of FIG. 3a after the batch composition has melted.

FIG. 4a shows the start of the distillation process according to an embodiment of the present invention.

FIG. 4b shows the end of the distillation process according to an embodiment of the present invention.

DESCRIPTION OF THE PREFERRED EMBODIMENTS

Figure 1:
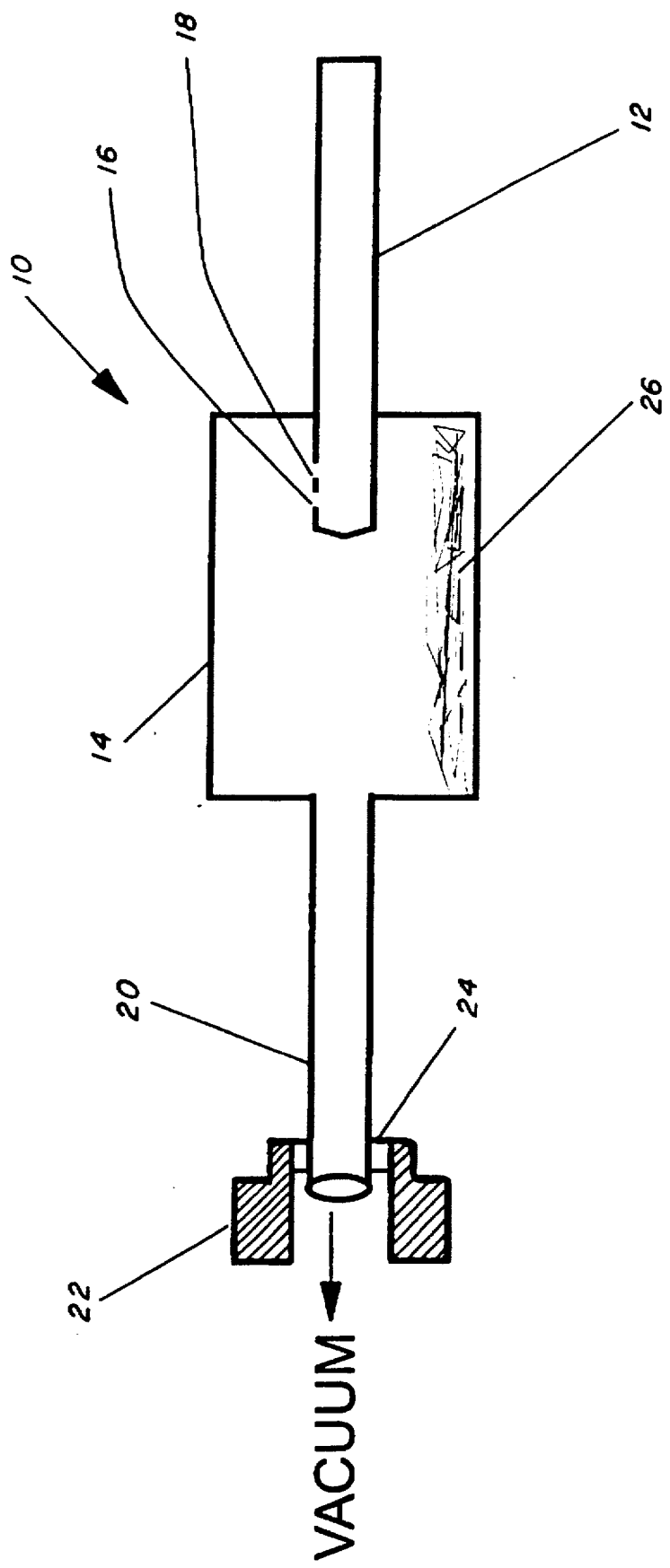
FIG. 1 shows a starting apparatus for carrying out a process according to the present invention.

The process of the present invention may be used to remove impurities from any chalcogenide or chalcohalide glass. In the present specification and claims, chalcogenide glass is defined as a glass containing S, Se, Te or their mixtures as the predominant anion by atomic percent, along with a metal such as Ge, As, Sb and Tl, or mixtures of metals. A chalcohalide glass is defined as a mixture of chalcogens and halide (such as F, Cl, Br, I and At, or mixtures thereof) along with a metal (such as Ge, As, Sb, Tl, or a mixture of metals). Typical chalcogenide glasses include: AsSe glasses such as $As_2Se_3$, AsS glasses such as $As_2S_3$; AsGeSe glasses such as $As_{12}Ge_{33}Se_{55}$; GeAsSeTe glasses such as $Ge_{30}As_{10}Se_{30}Te_{30}$; GeS glasses; GeSe glasses; AsSSe glasses; GeSSe glasses; GeAsS glasses; GeSbSe glasses such as $Ge_{28}Sb_{12}Se_{60}$. Chalcogenide glasses may be rare earth-doped or undoped. For example one useful rare earth-doped chalcogenide glass is GeAsGaS (In,Se) (in various atomic ratios). Typical chalcohalide glasses include AsSX glasses where X is a halogen or a mixture of halogens, such as AsSI and $As_{40}S_{50}Cl_{10}$; AsTeX glasses where X is a halogen or mixture of halogens, such as $As_{40}Te_{40}Br_{20}$ and $As_4Te_5I_2$; AsSeX glasses where X is a halogen or mixture of halogens, such as AsSeI; GeSX glasses, where X is a halogen or mixture of halogens, such as $Ge_{23}S_{47}I_{30}$; $As_{51}S_{34}Cl_5Br_5I_5$, and GeAsSeTeX glasses where X is a halogen or mixture of halogens, such as $Ge_{30}As_{10}Se_{30}Te_{20}I_{10}$. This list of glasses for which the present invention is useful is not intended to be exhaustive. Many other chalcogenide glasses and chalcohalide glasses may be successfully and beneficially processed according to the present invention.

Typically, it is desirable to employ the most halogenated form of either sulfur, selenium, aluminum, magnesium, zirconium, or a mixture thereof, as the halide. For example, $TeCl_4$ is generally more preferable as the halide than is $TeCl_2$ or $TeCl_3$. This preference arises because each mole of $TeCl_4$ will react with four moles of hydrogen ($TeCl_4+2H_2S \rightarrow Te+2S+4HCl$) or one mole of carbon ($TeCl_4+C \rightarrow CCl_4+Te$), while each mole of $TeCl_2$ reacts only with two moles of hydrogen ($TeCl_2+H_2S \rightarrow Te+S+2HCl$) or one-half mole of carbon ($TeCl_2+½(C) \rightarrow ½ (CCl_4)+Te$).

The halogen portion of the halide may be any halogen. Typically, the halogen portion is F, Cl, Br, I, or a mixture thereof (mixed halide such as $TeClF_5$). Although At is chemically acceptable as the halogen portion of a halide used in the method of the present invention, its radioactivity may make its use impractical in most applications. Halogens which provide the most stable H—X product, such as F and Cl, are the most desirable. The reactivity of HF with most glasses, however, contraindicates the use of a fluoride as the halide when the process of the present invention is being carried out in containers susceptible to attack by HF, such as silica.

The metal or chalcogen portion of the halide may be S, Se, Te, Po, or a metal that forms a stable (e.g., refractory) oxide. These stable oxide-forming metals include aluminum, magnesium, and zirconium.

The addition of a metal halide in which the oxide of the metal has a low free energy of formation relative to the free energy of oxygen in the glass also removes unwanted oxide impurities that cannot be removed from the batch glass by distillation. For example, the reaction of $AlCl_3$ with H—Se and oxide impurities produces $Al_2O_3$, HCl and Se and with carbon produces $CCl_4$. The HCl and $CCl_4$ by-products will be outgassed. The $Al_2O_3$ by-product is eliminated by distillation of the melted and reacted batch glass. Other additives that behave analogously to $AlCl_3$ are $MgCl_2$, $MgF_2$, $MgBr_2$, $MgI_2$, and $MgAt_2$.

Sufficient halide should be added to assure that essentially all hydrogen and/or carbon present in the batch glass reacts with the halide to produce HCl and/or $CCl_4$. Thus, the minimum amount of halide to be added to the batch composition will depend on the suspected concentration of hydrogen and/or carbon in the batch, the degree to which hydrogen and/or carbon must be removed for the intended application of the glass, and the particular halide selected. Generally, at least about one and four molar equivalents of halide should be added for each molar equivalent of hydrogen impurity and carbon impurity suspected of being in the sample, respectively. A small excess of halide would typically be even more desirable to allow for more complete reaction between the halide and the hydrogen impurity. For example, in a typical AsSe glass intended for use in chemical detection in the 2–12 μm range, a minimum of halide concentration of about 10 ppm is used when $TeCl_4$ is the halide. More often, the a halide concentration of about 10 ppm to about 1000 ppm is used when $TeCl_4$ is the halide. Most often, a halide concentration about 10 to about 100 ppm is used when $TeCl_4$ is the halide. The over-addition of halide, although wasteful, does not usually deleteriously affect the process or the glass; nor is the concentration of the halide high. Any unreacted metal halide decomposes and dissolves harmlessly in the reacted and melted batch.

After the halide has been added to the batch composition, the batch composition is then heated to a temperature at which the halide reacts with hydrogen and/or carbon in the batch to produce gaseous HCl and/or gasoues $CCl_4$, which are outgassed from the heated glass. The batch glass composition should be heated to at least a temperature at which the halide reacts with any hydrogen and/or carbon in the batch. Higher reaction temperatures increase the reaction rate. However, if the reaction temperature is too high, contamination from the reaction container and other environmental sources becomes a concern. Advantageously, the reaction is performed either under a vacuum or under a non-reactive gas such as argon or nitrogen.

FIG. 1 shows the construction of a glassware apparatus 10 useful for performing an embodiment of the method of the present invention. Tube 12 extends (typically longitudinally, as shown) partially within reaction chamber 14, and includes two small holes, 16, 18, within reaction chamber 14. Except for small holes 16, 18 on its circumferential surface, tube 12 is closed. Reaction chamber 14 has two end surfaces and a central longitudinal axis extending therebetween. Reaction chamber 14 also includes an open-ended tailpipe 20 in fluid communication with reaction chamber 14 and tube 12. Both tube 12 and tailpipe 20 form an airtight connection to the end surfaces of reaction chamber 14. Additionally, both tailpipe 20 and tube 12 extend longitudinally (typically coaxially) outward from reaction chamber 14. Vacuum fitting 22, including seal 24, connects tailpipe 20 to a vacuum (not shown). Both tailpipe 20 and tube 12 connect with the reaction chamber in an airtight fashion. Preferably, apparatus 10 is monolithic.

After the batch composition 26, including the added metal halide, is placed within the wide section of reaction chamber 14, apparatus 10 is evacuated by a vacuum applied via tailpipe 20. The tailpipe 20 is then collapsed and sealed, for example by heat from an oxygen methane flame, while apparatus 10 is under vacuum, to form assembly 10' shown in FIG. 2.

Figure 2:
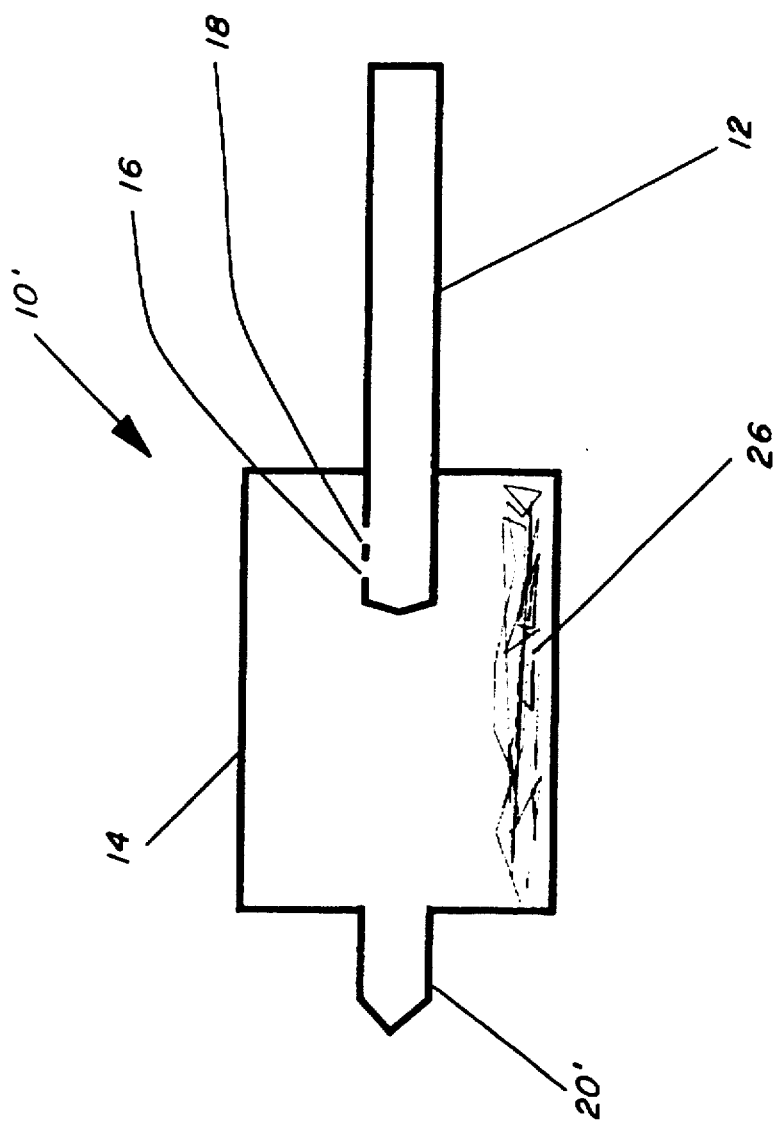
FIG. 2 shows the apparatus of FIG. 1 after it has been evacuated and sealed.

As shown in FIG. 2, assembly 10' includes reaction chamber 14, a stub 20' from where tailpipe 20 was closed, and tube 12 with small holes 16 and 18. Batch composition 26, including added halide, rests within the wide section of reaction chamber 14.

As shown in FIG. 3a and 3b, assembly 10', with batch composition 26 therein, is placed inside two-zone furnace 100 so that reaction chamber 14 is entirely within first zone 102 and the portion of tube 12 external to reaction chamber 14 lies within second zone 104. The temperature within first zone 102 should be sufficiently high to react the added halide with any hydrogen and/or carbon impurities in batch composition 26, and to convert batch composition 26 into a melt, preferably a homogenized glass melt 26'. In the Examples accompanying the present specification, this reaction was permitted to occur for about 7 hours–14 hours. This time needed for complete reaction, however, may vary depending upon batch size, concentration and type of halide, and the type of batch composition. The best reaction times for various combinations of glass type, halide, batch size, and concentration of halide is best determined empirically by examining the finished glass (using x-rays, transmission electron microscopy (TEM), IR spectroscopy, etc.).

The temperature within first zone 102, should, however, be lower than the temperature within second zone 104 to prevent condensation into tube 12. The temperature differential desired may be determined empirically. Typically, a temperature difference of about 50° C. or more is sufficient. For example, zone 102 may be at 775° C. while zone 104 is maintained at 825° C. Preventing vaporization and condensation of melt glass 26' and the components of batch composition 26 assures the compositional stability of batch composition 26 during its conversion into glass melt 26'.

Then, as shown in FIG. 4a and 4b, furnace 100 is angled, typically at about 10° to about 90° and more often at about 20° to about 45°, so that the end surface of reaction chamber 14 contacting tube 12 is lower than the other end surface of reaction chamber 14. Glass melt 26' in reaction chamber 14 is distilled into tube 12, through holes 16, 18 (FIG. 2), by raising the temperature in first zone 102 to a temperature at which vapors from glass melt 26' in first zone 102 condense into second zone 104, which is maintained at a temperature somewhat lower than that in first zone 102 so that the glass condenses as a melt in second zone 104. Thus, after distillation, any particulate impurities remain in reaction chamber 14, while glass melt 26' is transferred to second zone 104 as an essentially particulate-free distillate. This essentially particulate-free distillate lacks a sufficient concentration of particulate matter to deleterious alter the desired properties of the glass.

The distillate is then homogenized and fined at above the softening point of the composition of glass melt 26'. To avoid condensation of the glass in reaction chamber 14, first zone 102 is maintained at a slightly higher temperature than second zone 104. This homogenization and fining also outgasses any HCl and $CCl_4$ dissolved in the gas. Typically, fining and homogenizing occurs over a period of about 4 hours–8 hours. The end point may be found by examining the finished glass. Fining time may be higher or lower depending upon batch size and processing temperatures. During this outgassing, reaction chamber 14 and the upper section of tube 12 provide headspace for outgassing from the glass composition in the lower section of tube 12.

After homogenization and fining, the glass may be cooled to at or below annealing temperature (and typically to room temperature) by any method that avoids the formation of cracks or other stresses that cannot be readily removed by subsequent annealing. For example, the glass in the bottom of tube 12 may be quickly cooled, by air quenching or by quenching in water, from above the softening temperature of the glass to at or below the annealing temperature of the glass. Quenching serves only to quickly cool the glass to a temperature at or below its annealing temperature. Thus, in most cases quenching may be as short or as long as desired without disturbing the desirable properties of the final glass product. Slow quenchings, however, are generally unnecessary, may waste time, and may slightly deteriorate the properties of some unstable glass compositions.

After cooling, the glass is annealed at a temperature at or just above the glass transition temperature. Typically, the glass is annealed at a temperature of about 5° C. above its glass transition temperature to about 30° C. above its glass transition temperature. More often, the glass is annealed at a temperature of about 5° C. above its glass transition temperature to about 20° C. above its glass transition temperature of the glass, and most often, the glass is annealed at about 5° C. above its glass transition temperature to about 15° C. above its glass transition temperature of the glass. The time of annealing may vary greatly, for example, from between several minutes to several hours, depending upon sample size. There is no detrimental effect from over-annealing. After the glass has completed annealing, the finished preform in tube 12 is slowly cooled to room temperature to avoid cracking or stressing the annealed glass. The resulting annealed preform may then be removed by cracking tube 12. The preform may then be drawn into fibers using any method for drawing fibers from glass preforms.

Having described the invention, the following examples are given to illustrate specific applications of the invention including the best mode now known to perform the invention. These specific examples are not intended to limit the scope of the invention described in this application.

EXAMPLES

Example 1

$TeCl_4$-doped $As_{40}Se_{60}$ Fiber

Elemental As, Se, and approximately 1000 ppm of $TeCl_4$ powder were batched into the quartz glassware shown in FIG. 1 under a nitrogen atmosphere inside a glove box. Reaction chamber 14 had a diameter of 1.5" and a length of 3". Tailpipe 20 was 5" in length, with an inner diameter of 6 mm and an outer diameter of 10 mm. Tube 12 was 8" in length, with an inner diameter of 8 mm and an outer diameter of 10 mm. The As and Se had been previously purified by baking off any residual oxide, which is a common impurity found in these chemicals. Although the $TeCl_4$ purity was only 99% (Johnson Mathey), it was used without further purification. In addition, a reference glass was made without any $TeCl_4$ doping. In both cases, the batches were sufficient to make approximately 22 g of $As_{40}Se_{60}$ glass. The glassware was evacuated to $10^{-5}$ Torr and subsequently sealed with an oxygen-methane flame. This assembly was placed in a two-zone furnace and subsequently processed as shown in FIG. 3a, FIG. 3b, FIG. 4a, and 4b. In the first step, where first zone 102 was at 775° C. and second zone 104 was at 825° C., the batch was melted and homogenized. Since the temperature of tube 12 was higher than that of reaction chamber 14, the melt remained in reaction chamber 14. The $TeCl_4$ reacted with the H—Se impurities to form HCl gas and Te, which subsequently goes into the glass network. It is well-known that $As_{40}S_{60}$ and $As_{40}Se_{60}$ glasses can be made with Te contents greater than 30% and 50%, respectively (*Glassy Semiconductors*, by Z. U. Borisova (Plennum Press, New York, 1981, the entirety of which is incorporated herein by reference)). Furthermore, since the phonon frequencies are related to the reduced mass, the heavier Te actually has a beneficial effect on the IR edge.

In the second step, the furnace was angled to approximately 30° C. and the glass melt distilled into tube 12 by reducing the temperature in tube 12 to 600° C. and raising the temperature in reaction chamber 14 to 800° C. Then, with the furnace and apparatus still angled, the distillate was homogenized and fined by heating tube 12 at 630° C. while the temperature of reaction chamber 14 was at 650° C. The temperature differential prevented any glass melt from condensing into reaction chamber 14 but allowed the melt to outgas any dissolved gases such as HCl due to the large head space above the melt.

Next, the temperatures of both sections were lowered to 450° C. and the assembly was removed from the furnace and quenched in water for approximately 2 seconds. The quenched assembly was then placed in the annealer at around 205° C., which is about 10° C. above the glass transition temperature. The annealer is subsequently slow cooled to room temperature.

The $TeCl_4$-doped and undoped $As_{40}Se_{60}$ glass rods were obtained in lengths of approximately 10 cm and with diameters of 6 mm. Fibers were subsequently drawn from the rods on a draw tower located in a class 100 clean room. The 240 μm diameter fibers were drawn at about 310° C. and at a rate of approximately 4 m/min. The losses of the fibers were measured using the traditional cut-back technique with an FTIR spectrometer (Analect Diamond 20). Table 2 lists the peak heights of the H—Se band for both fibers and the estimated H—Se impurity content from the extinction coefficient described in Table 1.

TABLE 2

H—Se peak height (dB/m) and the estimated H—Se concentration for $TeCl_4$ doped and undoped $As_{40}Se_{60}$ fibers

| Glass | $TeCl_4$ content (ppm) | H—Se peak height (dB/m) | H—Se content (ppm) |
| --- | --- | --- | --- |
| undoped | 0 | 19 | 17.3 |
| doped | 1000 | 0.7 | 0.6 |

The $TeCl_4$ doping has resulted in a significant reduction in the intensity of the H—Se absorption, by almost a factor of 30, to a record low value of 0.7 dB/m. Furthermore, the H—Se combination band at around 4.1 μm has been completely removed. The $CO_2$ band centered at about 4.3 μm arises from residual impurities in the $TeCl_4$. Higher purity $TeCl_4$ would obviously eliminate this problem and optimization of the process would require less $TeCl_4$ than that used. In fact, the $TeCl_4$ to H—Se ratio could be as low as 1:4 since each $TeCl_4$ liberates 4Cl.

Example 2

$TeCl_4$-doped $As_{40}S_{58}Se_2$ Fiber

Elemental As, Se, S and approximately 1000 ppm of $TeCl_4$ powder were batched into the quartz glassware shown in FIG. 1 under a nitrogen atmosphere inside a glove box. Reaction chamber 14 had a diameter of 1.5" and a length of 3". Tailpipe 20 was 5" in length, with an inner diameter of 6 mm and an outer diameter of 10 mm. Tube 12 was 8" in length, with an inner diameter of 8 mm and an outer diameter of 10 mm. The As and Se had been previously purified by baking off any residual oxide, which is a common impurity found in these chemicals. Although the $TeCl_4$ purity was only 99% (Johnson Mathey), it was used without further purification. In addition, a reference glass was made without any $TeCl_4$ doping. In both cases, the batches were sufficient to make approximately 10 g of $As_{40}S_{58}Se_2$ glass. The glassware was evacuated to $10^{-5}$ Torr and subsequently sealed with an oxygen-methane flame. This assembly was placed in a two-zone furnace and subsequently processed as shown in FIG. 3a, FIG. 3b, FIG. 4a, and 4b. In the first step, where first zone 102 was at 600° C. and second zone 104 was at 650° C., the batch was melted and homogenized for 8 hours. Since the temperature of tube 12 was higher than that of reaction chamber 14, the melt remained in reaction chamber 14.

In the second step, the furnace was angled to approximately 30° C. and the glass melt distilled into tube 12 by reducing the temperature in tube 12 to 450° C. and raising the temperature in reaction chamber 14 to 840° C. Distillation was performed for 8 hours. Then, with the furnace and apparatus still angled, the distillate was homogenized and fined by heating tube 12 at 700° C. while the temperature of reaction chamber 14 was at 830° C. The temperature differential prevented any glass melt from condensing into reaction chamber 14 but allowed the melt to outgas any dissolved gases such as HCl due to the large head space above the melt. Homogenization and fining were performed for 8 hours.

Next, the temperatures of chamber 14 was lowered to 360° C. and the temperature of tube 12 lowered to 450° C. The apparatus was maintained in this condition for 2 hours. Then the furnace power was shut off, and the contents allowed to cool within.

The $TeCl_4$-doped and undoped $As_{40}S_{58}Se_2$ glass rods were obtained in lengths of approximately 10 cm and with diameters of 6 mm. Fibers were subsequently drawn from the rods on a draw tower located in a class 100 clean room. The 240 μm diameter fibers were drawn at about 310° C. and at a rate of approximately 4 m/min. The losses of the fibers were measured using the traditional cut-back technique with an FTIR spectrometer (Analect Diamond 20).

Figure 5:
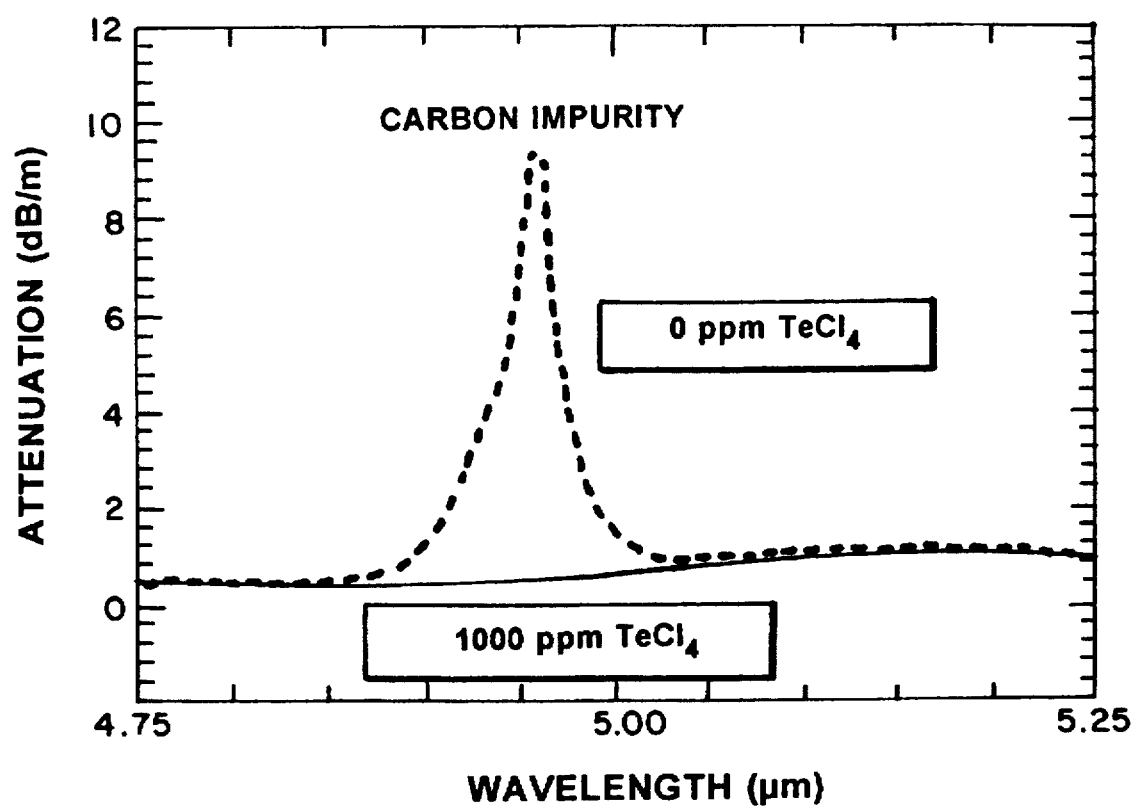
FIG. 5 is a graph of attenuation vs. wavelength comparing fibers made with $TeCl_4$ added to the batch glass (dashed line) and fibers made without $TeCl_4$ (solid line). The graph is focused on the wavelengths at which carbon impurities absorb.

FIG. 5 is a graph of showing the attenuation (dB/m) of $TeCl_4$ in the 4.75 to 5.75 μm range. As shown in FIG. 5, the undoped fiber of Example 2 exhibited an attenuation peak at about 4.95 μm. This peak was attributed to the presence of carbon impurities. This peak was essentially non-existent in the $TeCl_4$-doped fibers of Example 2. These results show that the addition of $TeCl_4$ to the batch glass removed essentially all carbon impurities from the fibers processed according to Example 2.

9

Obviously, many modifications and variations of the present invention are possible in light of the above teachings. It is therefore to be understood that, within the scope of the appended claims, the invention may be practiced otherwise than as specifically described.

What is claimed is:

1. A method comprising the steps of:

adding tellurium halide to a batch composition, thereby forming a halide-containing batch composition, said batch composition contains hydrogen impurities;

heating said halide-containing batch composition to melt said batch composition thus forming a glass melt, and to react said tellurium halide with said hydrogen impurities to form HCl;

distilling said glass melt to form a distillate essentially free of particulate matter; and outgassing said distillate.

2. The method of claim 1, wherein the concentration of said tellurium halide in said halide-containing batch composition is about 10 ppm–1000 ppm.

3. The method of claim 2, wherein the concentration of said tellurium halide in said halide-containing batch composition is about 10 ppm–100 ppm.

4. The method of claim 1, further comprising the step of cooling said distillate to form a solid glass and annealing said solid glass.

5. The method of claim 4, further comprising the step of drawing said annealed glass into a fiber.

6. The method of claim 1, wherein said tellurium halide is $TeCl_n$ where n is 2, 3, or 4.

7. The method of claim 6, wherein said tellurium halide is $TeCl_4$.

8. The method of claim 1, wherein said distillate is selected from the group consisting of AsSe glasses, AsS glasses, AsGeSe, GeAsSeTe glasses, GeS glasses, GeSe glasses, AsSSe glasses, GeSSe glasses, GeAsSe glasses GeSbSe glasses, GeAsGaS(In,Se), AsSX glasses where X is a halogen or a mixture of halogens, AsTeX glasses where X is a halogen or mixture of halogens, AsSeX glasses where X is a halogen or mixture of halogens, GeSX glasses, where X is a halogen or mixture of halogens, and GeAsSeTeX glasses where X is a halogen or mixture of halogens.

9. The method of claim 1, further including the step of estimating the amount of hydrogen impurities in said batch composition and wherein the amount of said tellurium halide added to said batch composition provides at least about 1 molar equivalent halogen for one molar equivalent of hydrogen impurities in said batch composition based upon said estimate.

10. The method of claim 1, wherein said tellurium halide is reacted with said hydrogen impurities for from about 7 hrs–14 hrs.

11. A method of forming a glass, comprising the steps of:

providing an apparatus comprising:

a reaction chamber having first and second opposing end surfaces and a longitudinal central axis extending therebetween;

a tailpipe in fluid contact with and extending longitudinally outward from said first opposing end surface of said reaction chamber, wherein said tailpipe forms an airtight connection with said first opposing end surface of said reaction chamber; and a tube having a first portion, the entirety of which extends within said reaction chamber, said tube having a second portion extending longitudinally from said second opposing end surface of said reaction

10 tion chamber and terminating external to said reaction chamber, each end of said tube being closed, said tube defining at least one opening along a circumferential surface of said first portion of said tube, and said tube forming an airtight connection with said second opposing end surface of said reaction chamber;

placing a chalcogenide or chalcohalide batch composition within said reaction chamber, said batch composition containing hydrogen impurities;

adding tellurium halide to said batch composition, thereby forming a halide-containing batch composition;

applying vacuum pressure to said apparatus;

sealing said apparatus under said vacuum pressure;

positioning said apparatus within a two-zone furnace so that said longitudinal axis of said reaction chamber is essentially oriented horizontally, said reaction chamber rests entirely within a first zone of said furnace, and said second portion of said tube rests entirely within a second zone of said furnace;

heating said halide-containing batch composition within said first zone of said horizontally oriented reaction chamber to melt said batch composition to form a glass melt and to react said tellurium halide with said hydrogen impurities to form HCl, while said second zone is at a temperature sufficiently higher than the temperature of said first zone to essentially prevent condensation of any glass or components of said glass melt into said second portion of said tube during said heating;

tilting said reaction chamber so that said second opposing end surface is higher than said first opposing end surface;

distilling said glass melt from said reaction chamber into said second portion of said tube while said second zone of said furnace is at a temperature below the temperature of said glass melt in said reaction chamber, so that said glass melt condenses in said second portion of said tube to form a distillate essentially free of particulate matter;

outgassing said distillate while the temperature of the second zone is at a temperature above the softening point of said distillate, and said first zone is at a temperature high enough to essentially prevent condensation of said distillate into said reaction chamber during said outgassing;

cooling said distillate to form a solid glass; and annealing said solid glass.

12. The method of claim 11, further including the step of estimating the concentration of hydrogen impurities in said batch composition and wherein the amount of said tellurium halide added to said batch composition provides at least about 1 molar equivalent halogen for one molar equivalent of hydrogen impurities in said batch composition based upon said estimate.

13. The method of claim 11, further comprising the step of drawing said annealed glass into a fiber.

14. The method of claim 11, wherein said tellurium halide is $TeCl_n$ where n is 2, 3, or 4.

15. A method comprising the steps of:

adding tellurium halide to a batch composition, thereby forming a halide-containing batch composition, wherein said batch composition contains carbon impurities; heating said halide-containing batch composition to melt said batch composition thus forming a glass melt, and to react said tellurium halide with said carbon impurities to form $CCl_4$;

distilling said glass melt to form a distillate essentially free of particulate matter; and outgassing said distillate.

16. A method comprising the steps of:

adding tellurium halide to a batch composition, thereby forming a halide-containing batch composition, said batch composition containing carbon impurities and hydrogen impurities;

wherein heating said halide-contains batch composition to melt said batch composition, thus forming a glass melt, and to react said tellurium halide with said carbon impurities and said hydrogen impurities to form $CCl_4$ and HCl, respectively;

distilling said glass melt to form a distillate essentially free of particulate matter; and outgassing said distillate.

* * * * *